United States Patent
Kosuru (10) Patent No.: US 10,846,707 B2
(45) Date of Patent: Nov. 24, 2020

(54) DYNAMICALLY REARRANGING AND DEPLOYING ADVERTISING SELECTION LOGIC

(75) Inventor: Yekesa Kosuru, Westford, MA (US)

(73) Assignee: Provenance Asset Group LLC, Pittsford, NY (US)

( * ) Notice: Subject to any disclaimer, the term of this patent is extended or adjusted under 35 U.S.C. 154(b) by 1530 days.

(21) Appl. No.: 12/163,421

(22) Filed: Jun. 27, 2008

(65) Prior Publication Data
US 2009/0327055 A1  Dec. 31, 2009

(51) Int. Cl.
*G06Q 30/02* (2012.01)
(52) U.S. Cl.
CPC ......... *G06Q 30/02* (2013.01); *G06Q 30/0207* (2013.01); *G06Q 30/0257* (2013.01)
(58) Field of Classification Search
CPC ............... G06Q 30/02; G06Q 30/0277; G06Q 30/0241; G06Q 30/0251; G06Q 30/0255; G06Q 30/0269; G06Q 30/0254; G06Q 30/0276
USPC .......................................................... 705/14
See application file for complete search history.

(56) References Cited

U.S. PATENT DOCUMENTS

| | | | |
|---|---|---|---|
| 2002/0035568 A1 | 3/2002 | Benthin | |
| 2004/0199415 A1* | 10/2004 | Ho | 705/8 |
| 2008/0195468 A1* | 8/2008 | Malik | 705/14 |
| 2009/0286520 A1* | 11/2009 | Nielsen | H04H 20/10 |
| | | | 455/414.2 |

OTHER PUBLICATIONS

Macromedia—JRun Live Docs: Overview of filters, Aug. 26, 2007.*
Jiani Guo et al., Load Balancing in a Cluster-Based Web Server for Multimedia Applications, IEEE Transactions on Parallel and Distributed Systems, vol. 17, No. 11, Nov. 2006.*
Aimeur et al. Privacy-preserving Demographic Filtering, 2006.*
Raymond, Eric S., "The Art of Unix Programming", Case Study: Making Word Lists, © 2003 Eric S. Raymond, p. 195.

* cited by examiner

*Primary Examiner* — Hao Fu
(74) *Attorney, Agent, or Firm* — Dinsmore & Shohl LLP (57) ABSTRACT

A method and system for deploying and customizing advertisement selection logic without requiring a shutdown and/or restart of system resources. A first arrangement of advertisement logic may include filters to be executed in a pipeline model. A second arrangement of advertisement selection logic may be determined based at least in part on information received. Alternatively, the second arrangement of advertisement selection logic may be automatic based at least in part on statistics or defined hints. The second arrangement of advertisement selection logic may be implemented using different filters or rearranged filters in an updated pipeline model.

31 Claims, 11 Drawing Sheets

```
Public interface AdFilter {
    public void initialize (ImmutableDataIsland pDataIsland, Map pCustomProps, Logger pLogger) throws
    Exception;
    public void filter (AdRequest pRequest);
    public void cleanup();
}
```
⸺ 402

FIG. 4

```
                                                              502
  <xs:schema xmlns:xs="http://www.w3.org/2001/XMLSchema"
         elementFormDefault="qualified" >
   <xs:element name="adserver" >
    <xs:complexType>
      <xs:sequence>
        <xs:element ref="pipelines"/>
        <xs:element minOccurs="0" maxOccurs="unbounded" ref="hints"/>
        <xs:element minOccurs="0" maxOccurs="unbounded" ref="criterion"/>
        <xs:element minOccurs="0" maxOccurs="unbounded" ref="params"/>
      </xs:sequence>
      <xs:attribute name="cluster-id" use="required" type="xs:string"/>
      <xs:attribute name="id" use="required" type="xs:string"/>
    </xs:complexType>
   </xs:element>
  <xs:element name="pipelines" >
   <xs:complexType>
     <xs:sequence>
       <xs:element maxOccurs="unbounded" ref="pipeline"/>
     </xs:sequence>
    </xs:complexType>
  </xs:element>
  <xs:element name="pipeline">
    <xs:complexType>
      <xs:sequence>
        <xs:element maxOccurs="unbounded" ref="adfilter"/>
      </xs:sequence>
      <xs:attribute name="name" use="required" type="xs:string"/>
    </xs:complexType>
  </xs:element>
  <xs:element name="adfilter">
   <xs:complexType>

<xs:attribute name="name" use="required" type="xs:string"/>
      <xs:attribute name="classname" use="required" type="xs:string"/>
      <xs:attribute name="hints-id" use="optional" type="xs:IDREFS"/>
      <xs:attribute name="criterion-id" use="optional" type="xs:IDREFS"/>
      <xs:attribute name="params-id" use="optional" type="xs:IDREFS"/>
    </xs:complexType>          504
   </xs:element>
  <xs:element name="hints">
   <xs:complexType>
      <xs:sequence>
        <xs:element maxOccurs="unbounded" ref="hint"/>
      </xs:sequence>
     <xs:attribute name="id" use="required" type="xs:ID"/>
    </xs:complexType>
  </xs:element>
  <xs:element name="hint" >
    <xs:complexType>
```

FIG. 5A

```xml
<xs:attribute name="name" use="required" >
  <xs:simpleType>
    <xs:restriction base="xs:string">                    /— 505
      <xs:enumeration value="deploy-first"/>
      <xs:enumeration value="deploy-last"/>
      <xs:enumeration value="deploy-on-high-load" />
      <xs:enumeration value="deploy-on-low-load" />
      <xs:enumeration value="optimize-for-revenue" />
      <xs:enumeration value="optimize-for-completion" />
      <xs:enumeration value="optimize-for-ctr" />
      <xs:enumeration value="serve-first-match" />
    </xs:restriction>
  </xs:simpleType>
</xs:attribute>
<xs:attribute name="value" use="optional" type="xs:string"/>
   </xs:complexType>
</xs:element>
<xs:element name="criterion">
  <xs:complexType>
    <xs:sequence>
      <xs:element maxOccurs="unbounded" ref="criteria"/>
    </xs:sequence>
    <xs:attribute name="id" use="required" type="xs:ID"/>
  </xs:complexType>
</xs:element>
```

FIG. 5B

```
<xs:element name="criteria" >
  <xs:complexType>
    <xs:attribute name="name"  use="required" type="xs:string" />
    <xs:attribute name="oper"  use="required" >
    <xs:simpleType>
       <xs:restriction base="xs:string">
         <xs:enumeration value="EQ"/>
         <xs:enumeration value="GT"/>
         <xs:enumeration value="LT" />
         <xs:enumeration value="LTEQ" />
         <xs:enumeration value="GTEQ" />
         <xs:enumeration value="NOTEQ" />
         <xs:enumeration value="LIKE" />
       </xs:restriction>
    </xs:simpleType>
    </xs:attribute>
    <xs:attribute name="value" use="required" type="xs:string"/>
  </xs:complexType>
</xs:element>
<xs:element name="params">
  <xs:complexType>
    <xs:sequence>
      <xs:element maxOccurs="unbounded" ref="param"/>
    </xs:sequence>
    <xs:attribute name="id" use="required" type="xs:ID"/>
  </xs:complexType>
</xs:element>
 <xs:element name="param" >
  <xs:complexType>
    <xs:attribute name="name"  use="required" type="xs:string" />
    <xs:attribute name="value" use="required" type="xs:string" />
  </xs:complexType>
 </xs:element>
</xs:schema>
```

FIG. 5C

```
<adserver cluster-id="nokia-americas-cluster-1" id="server1">
  <pipelines>
    <pipeline name="WebRequestPipeline">
      <adfilter name="CampaignSlicer" classname="nokia.adserver.filters." hints-id="H1"/>
      <adfilter name="SponsorshipCampaignSelector" classname="nokia.adserver.filters.sponsorship.SponsorshipFilter" />
      <adfilter name="GuaranteedCampaignSelector" classname="nokia.adserver.filters.guranteed.GuaranteedFilter" params-id="P1" />
      <adfilter name="RemnantCampaignSelector" classname="nokia.adserver.filters.remnant.RemnantFilter" params-id="P2" />
      <adfilter name="GatherStats" classname="nokia.adserver.filters.GatherStatistics" hints-id="H2" params-id="P3"/>
    </pipeline>
  </pipelines>
  <hints id="H1">
    <hint name="deploy-on-high-load" />
  </hints>
  <hints id="H2">
    <hint name="deploy-on-low-load" />
  </hints>
  <params id="P1">
    <param name="serve-first-match" value="true" />
  </params>
  <params id="P2">
    <param name="optimize-for-revenue" value="true" />
  </params>
  <params id="P3">
    <param name="statistic" value="campaign-thirst-factor" />
    <param name="statistic" value="campaign-reduction-factor-per-filter" />
  </params>
</adserver>
```

DYNAMICALLY REARRANGING AND DEPLOYING ADVERTISING SELECTION LOGIC

FIELD OF INVENTION

Embodiments of the invention relate generally to updating and distributing electronic information. In particular, embodiments are directed to deploying and customizing advertisement selection logic.

BACKGROUND

Advertising-supported applications are increasing in popularity as advertisers and companies strive for new ways to reach the public or a specified segment thereof. Advertising-supported application or adware is any software package which e.g. automatically plays, displays, or downloads advertising material to a computer after the software is installed on it or while the application is being used. Advertising-supported applications are often small and unobtrusive to attract more users and appear less invasive. Companies often offer greater discounts or special offers through these applications as an incentive to use the advertising applications. Advertising-supported applications have been developed for computing devices such as desktop computers, laptops and even mobile devices, such as Personal Data Assistants (PDAs) and cellular phones.

One or more modules may work together to optimize the selection of advertisements to be displayed on a computer or handheld device. Such modules may include a demographic targeting module, a behavior targeting module, and/or an optimization module. Advertisement selection logic refers to e.g. code or a selection of algorithms from collaborating modules that sieve through available advertisement campaigns in the interest of identifying the best advertising campaign material to present to each advertisement request originating from a computing device. The advertisement selection logic may be implemented as filters and deployed in a pipeline (sequence) model. The pipeline may be a conduit set up with a series of filters through which requests for advertisements flow. The filters reduce an inputted campaign list to a smaller subset by filtering out non-matching campaigns. Each filter with the exception of the first filter starts out with a campaign list that was outputted from a previous filter. In a system, where hundreds of thousands of campaigns are simultaneously active, it may be beneficial to deploy the most selective filter first in the pipeline model. The filter that eliminates the most number of advertisement campaigns from an input list may be referred to as the most selective filter and may be recommended to be the first filter used in the pipeline model.

Finding optimal ways to determine the most efficient sequences of filters under different operating conditions may prove quite challenging. For example, the most efficient sequence of filters may vary by time of day/day of week, channel, site, spot, short term and long term behaviors, and/or events. Furthermore, as the system gathers statistics some filters may outperform others in reducing the inputted campaign list. Though the order of filters may be changed or new filters added, such changes typically require a recompilation and restart of the system or at least some part of the system resources, which is impractical due system size, load, and availability.

Furthermore, improvements and new features are constantly being developed. Some of those new features may be included in custom advertisement selection logic. Owners of the custom logic may want to test these new features to determine interest and operational performance. However, shutdowns of system resources to implement new features and potential numerous restarts of system, if errors occur, are not desirable.

Therefore, at least for the foregoing reasons embodiments for dynamically rearranging and deploying advertising selection logic without requiring a recompilation and system restart would be advantageous.

SUMMARY

Many of the aforementioned problems are solved by providing for deploying and customizing advertisement selection logic without a shutdown and/or restart of system resources, according to one or more example embodiments or aspects described herein.

In an aspect of the invention, developers or administrators may create custom advertisement selection logic to be used to optimize advertisement selection for delivery to various devices. The advertisement selection logic may be comprised of numerous filters which may be part of different modules.

In another aspect of the invention, a first arrangement of advertisement selection logic may be received. The first arrangement of advertisement selection logic may include at least one advertisement filter. The at least one advertisement filter may be processed in a pipeline model. A second arrangement of advertisement selection logic may also be determined. The second arrangement of advertisement selection logic may also be processed in the pipeline model during runtime of the at least one advertisement filter.

In another aspect of the invention, a request may be received to process a first advertisement selection list. The first advertisement list may include a first amount of advertisement campaigns. The first advertisement selection list may be received and processed at a first filter. Output from the first filter may comprise a second advertisements selection list with a second amount of advertisement campaigns. The second advertisement selection list may be processed through a second filter with the output including a third advertisement selection list having a third amount of advertisement campaigns. Similarly, the third advertisement selection list may be processed through a third filter with the output including a fourth amount of advertisement campaigns. The processing sequence for the first, second and third filter may be rearranged during runtime and processed in a pipeline for processing subsequent advertisement selection lists.

In accordance with another aspect of the invention, a server may receive a first arrangement of advertisement selection logic. The first arrangement of advertisement logic may include filters to be executed in a pipeline model. The output of a first filter may be input to the next succeeding filter. The server may determine a second arrangement of advertisement selection logic based at least in part on information received from administrators/developers or automatically based at least in part on statistics or defined hints. The second arrangement of advertisement selection logic may be implemented using different filters or rearranged filters in the pipeline model without recompilation and/or shutdown of the server.

These as well as other advantages and aspects of the invention are apparent and understood from the following detailed description of the invention, the attached claims, and the accompanying drawings.

BRIEF DESCRIPTION OF THE DRAWINGS

Some example embodiments of the present invention are illustrated by way of example and not limited in the accompanying figures in which like reference numerals indicate similar elements.

FIGS. 5A through 5C illustrate an Extensible Markup Language (XML) schema definition of a deployment descriptor describing a pipeline configuration according to one or more aspects described herein.

DETAILED DESCRIPTION

In the following description of various example embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
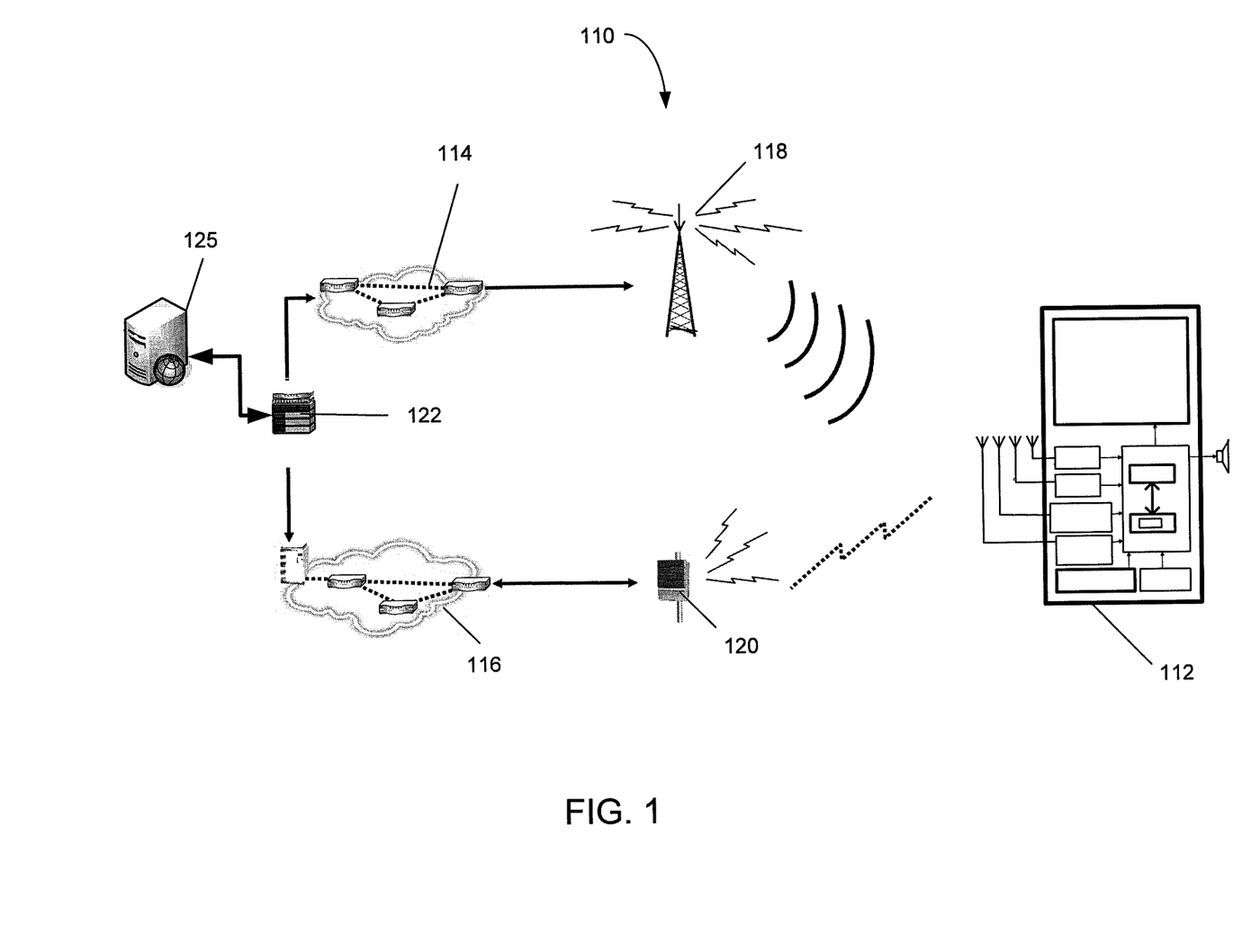
FIG. 1 illustrates a block diagram of a communication system according to one or more aspects described herein.

Aspects of the present invention may be utilized across a broad array of networks and communication protocols. FIG. 1 illustrates an example of a wireless communication system 110 in which systems and methods according to at least some embodiments may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 (which may include the internet or similar network) and/or a cellular network 116. The mobile terminal/device 112 may include a digital broadband broadcast receiver device. The service source 122 may be connected to several service providers such as advertisement source 125 that may provide their actual program content or information or description of their services and programs to the service source 122 that further provides the content or information to the mobile device 112. The several service providers including advertisement source 125 may include but are not limited to one or more television and/or digital television service providers, AM/FM radio service providers, advertisement servers and/or providers, SMS/MMS push service providers, internet content or access providers.

In one or more arrangements, broadcast network 114 may broadcast advertisements from one or more service sources such as service source 122. Service source 122 may obtain or receive advertisements from an advertisement server or provider. The advertisements may then be received by mobile terminal 112 through the broadcast network 114 and stored in a database for display to a user of terminal 112. In one example, a broadcast service source 122 may obtain revenue from displaying advertisements in their broadcasts. As such, the broadcast service source 122 may periodically retrieve advertisements from an advertisement source 125 or database and broadcast the advertisement to a user population subscribed to the broadcast service. One method of broadcasting data is using internet protocol datacasting (IP datacasting, IPDC). IPDC combines digital broadcasting and internet protocol. As such, a variety of information and services may be transmitted using such a network and protocol.

The mobile device 112 may also send and receive messages to and from the service source 122 through the cellular network 116. The cellular network 116 may include a wireless network and a base transceiver station transmitter 120. The cellular network may include a second/third-generation (2G/3G) cellular data communications network, a Global System for Mobile communications network (GSM), a Universal Mobile Telecommunications System (UMTS) and/or other wireless communication network such as a wireless local area network (WLAN). In one or more aspects, communications through the cellular network 116 may allow a service source 122 to distribute advertisements on an individual basis. That is, rather than broadcasting advertisements to an entire subscriber population, the service source 122 may obtain and distribute advertisements from an advertising source 125 based at least in part on user interests, usage statistics, a user's most frequent time of use and the like. Alternatively or additionally, mobile device 112 may access either the broadcast network 114 or cellular network 116 to retrieve advertisements or other forms of content from a server or content provider 122. In one example, device 112 may request additional advertisements from an advertisement server 125 in response to determining that no advertisements are stored in device 112.

In accordance with one or more aspects of the invention, mobile device 112 may include a wireless interface configured to send and/or receive digital wireless communications within cellular network 116 using base transceiver station transmitter 120. The information received by mobile device 112 through the cellular network 116 or broadcast network 114 via a cellular network tower 118 may include user input or selection (for example, in an interactive transmission), applications, services, electronic images, content requests, audio clips, video clips, and/or WTAI (wireless telephony application interface) messages. As part of cellular network 116, one or more base stations (not shown) may support digital communications with receiver device 112 while the receiver device is located within the administrative domain of cellular network 116.

Figure 2:
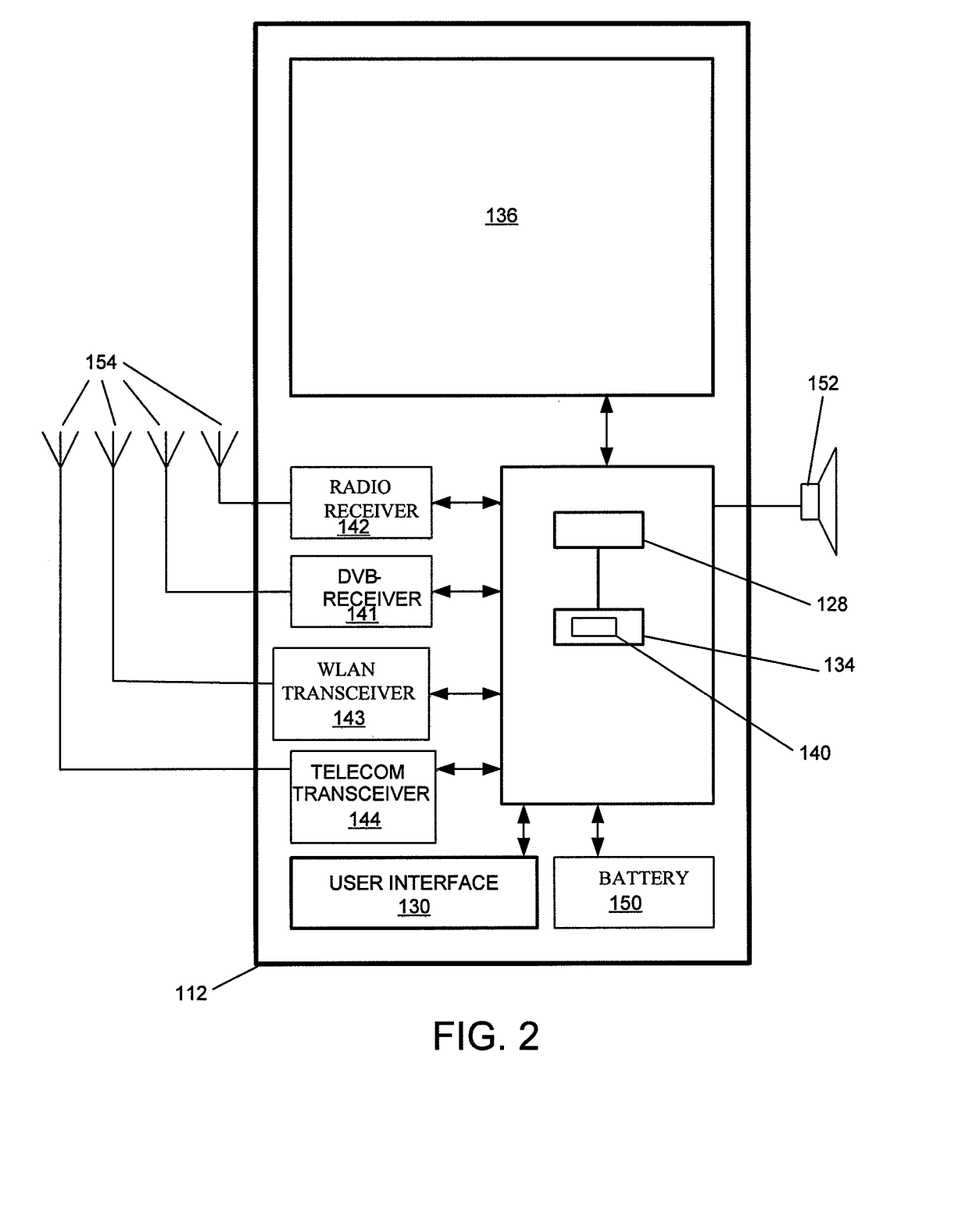
FIG. 2 illustrates an apparatus according to one or more aspects described herein.

As shown in FIG. 2, an example mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, stylus, data glove, mouse, roller ball, touch screen, or the like. In addition, user interface 130 may include the entirety of or portion of display 136. Other configurations for mobile devices are known to exist and obvious to persons skilled in the art.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of the computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data system (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-Multimedia Home Platform, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation. The power of receiver between bursts may be turned off to reduce power consumption.

In one or more configurations, a user of a mobile device may agree to receive advertisements on her mobile device. To facilitate the display of advertisements and other applications, the user's mobile terminal may include an advertisement middleware that provides an application programming interface (API) that allows an application to call standardized functions for retrieving advertisements or performing other advertising tasks.

Middleware, in general, refers to an entity that facilitates interaction between software and/or hardware components. For example, a middleware may perform processes such as mediation between an application and a network to manage the interaction between disparate applications across heterogeneous platforms. The advertisement middleware may provide a variety of functionalities associated with the display and retrieval of advertisements. Advertisement middleware may be stored in a computer readable medium 134 in a user's mobile terminal 112 along one or more advertisement applications that may interface with the middleware. Advertisement middleware may also include components for interfacing with one or more hardware components such as WLAN transceiver 143, telecom transceiver 144 and display 136 to perform one or more tasks.

Figure 3:
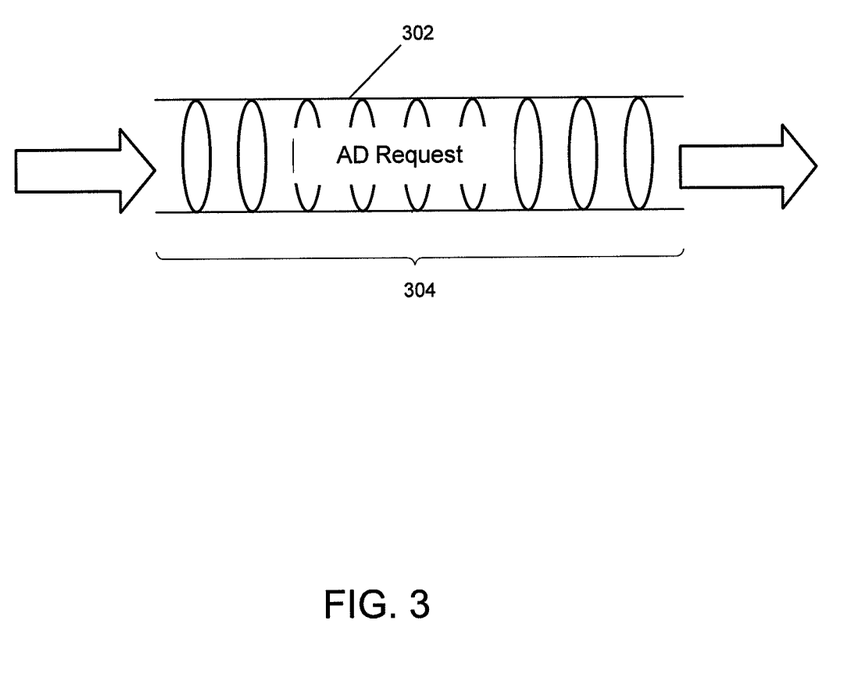
FIG. 3 illustrates advertisement filter pipeline architecture according to one or more aspects described herein.

FIG. 3 illustrates advertisement filter pipeline architecture 302 in accordance with an aspect of the invention. In FIG. 3, advertisement selection logic may be implemented as one or more advertisement filters deployed in a pipeline 304. An advertisement server may transport advertisement requests through the configured pipeline 304. A campaign list outputted from a first filter may be used as input to sequential filters found in the filter pipeline architecture 302.

In an aspect of the invention, an advertisement server may rearrange advertisement filters manually and/or automatically. In an example embodiment, administrators or others with appropriate permissions may alter a pipeline configuration through modification of a server deployment file. The changes may be invoked with the use of a invoke command. In this aspect of the invention, advertisement filter entries in a configuration file are rearranged and the command is executed to upload the rearranged pipeline configuration. Upon completion of the command, the new pipeline configuration may be implemented.

In another aspect of the invention, an advertisement server may rearrange an advertisement filter sequence based at least in part on hints and/or load statistics. In an example embodiment, a hint may include specific logic statements and/or commands to be implemented. For example, a hint may include dynamic hints such as:

deploy-on-high-load
or
deploy-on-low-load
or
skip-on-high-load

In an aspect of the invention, based at least in part on statistics of each filter, dynamic hints, and/or system statistics (e.g. load statistics) the advertisement server rearranges the sequence of advertisement filters. In another example embodiment, the advertisement server may decide not to use particular filters.

In an example embodiment of the invention, the sequence of filters in the pipeline may be discovered from a server deployment file. Administrators may alter the sequence at any time and invoke a server command to uptake the new sequence.

In an advertisement server with millions of campaigns simultaneously active, and when the system is under excessive load there may be cases where it may not be practical to invoke all filters for every request. Also in various example embodiments, when patterns are recognized, it may be more efficient to let the server dynamically alter the sequence of ad filters to eliminate campaigns quickly. For example, in a system with user interests deployed, it may be beneficial to execute an user interests filter ahead of other filters as it may eliminate numerous advertisement campaigns quickly. Those skilled in the art will realize that additional hints than those described in the XML schema file may be used with various aspect of the invention in which filter sequences may be rearranged on the fly without server shutdowns.

In an aspect of the invention, a
skip-on-high-load hint may be utilized during periods of high load experienced by the advertisement server. This hint may indicate to the advertisement server that when the advertisement server is under excessive load (to be defined e.g. by an administrator), it may be safe to skip the filter identified. In an example embodiment, the filter and relevant hints are associated in the server deployment file. When the load on the advertisement server settles down, the advertisement server may activate the filter again.

In another aspect of the invention, a deploy-on-high-load hint may be used to indicate to an advertisement server that the identified filter should be implemented. In the example shown in FIG. 6, CampaignSlicer filter 602 may produce a reasonably sound statistical sample consisting of subset of advertisements for consideration by subsequent filters. This may improve the overall efficiency of the advertisement server. In an example embodiment, if a filter installed at a certain position is skipped due to a hint, then all subsequent filters are shifted up for that execution. In an example embodiment, the hint may only appear for some advertisement requests. For example, a user who originates a request where the user has been identified as having history of clicks, then an appropriate hint may be placed by a module (such as self-learning module) outside of the advertisement filter pipeline, telling the pipeline on how best to rearrange the filter sequence. In another example embodiment, hints may only be suggestions to the server, which may or may not be honored.

As those skilled in the art will realize, the described hints are examples and that more hints may be developed and added as needed. The hints may be set up in server deployment file and altered as required. In an example embodiment, a server uptake command may be executed in order for the new hints to be implemented.

Figure 4:
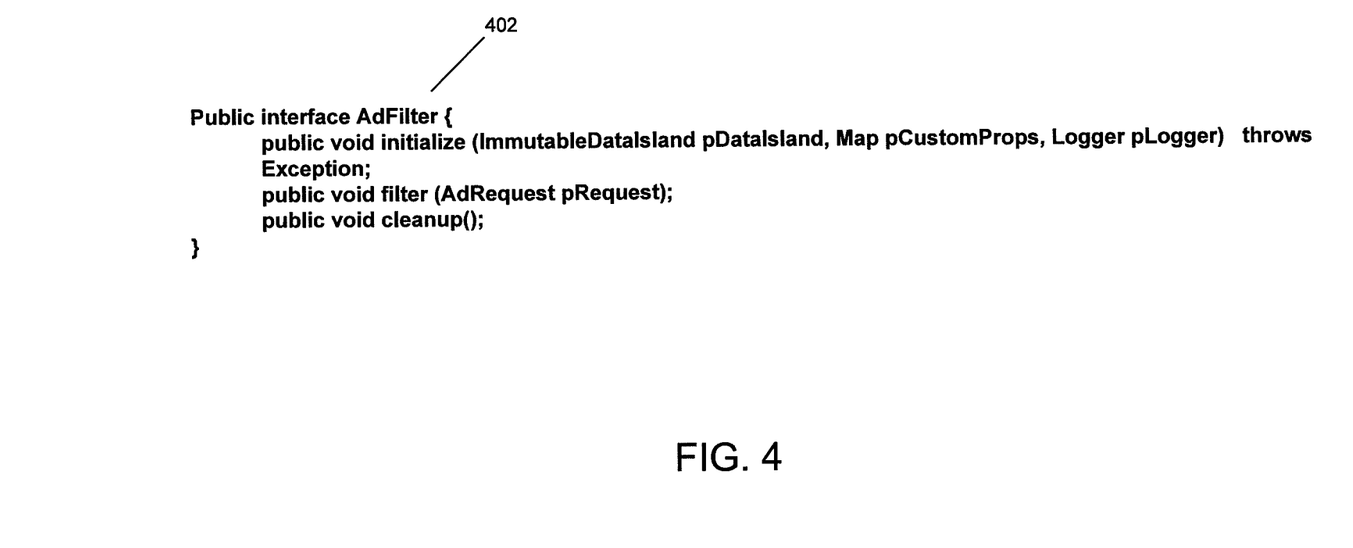
FIG. 4 illustrates an advertisement filter interface implemented by advertisement filters according to one or more aspects described herein.

According to one or more aspects described herein, an advertisement filter may be implemented in accordance with a filter interface. In an example embodiment, each filter may be required to comply with an AdFilter interface. FIG. 4 illustrates an AdFilter interface 402 in accordance with an example aspect of the invention. Those with proper permissions may modify an already deployed filter or add a new filter for use by the advertisement server. The advertisement filter code may be compiled using a compile script of the advertisement server so that the code is parsed to ensure that the code is compliant with documented rules. When the parsing step succeeds, the class may be compiled. When compiled successfully, the class file may be placed in a specified certain location for uptake by the advertisement server.

Figure 5B:
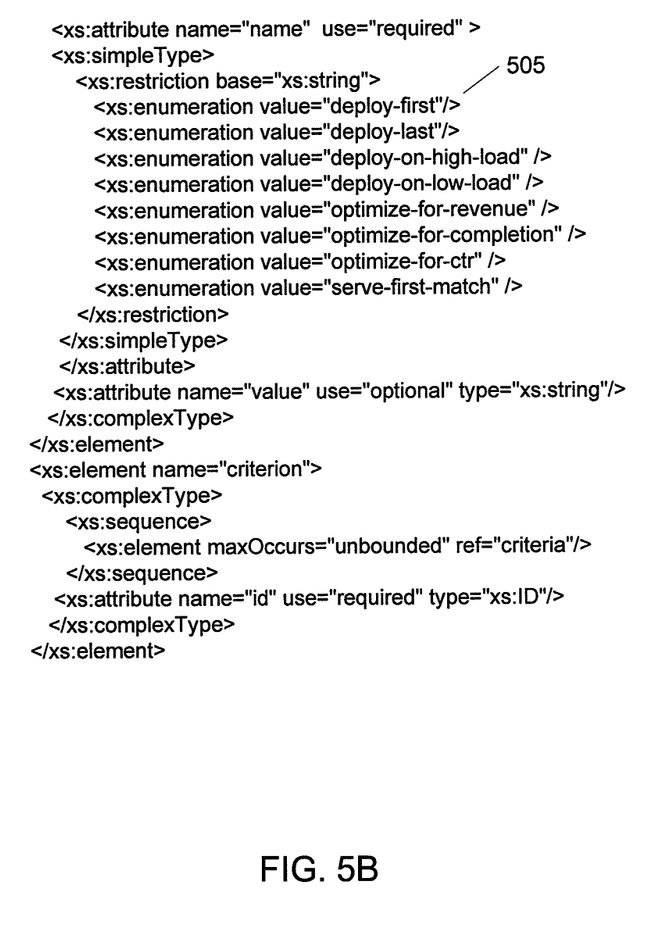
Figure 5C:
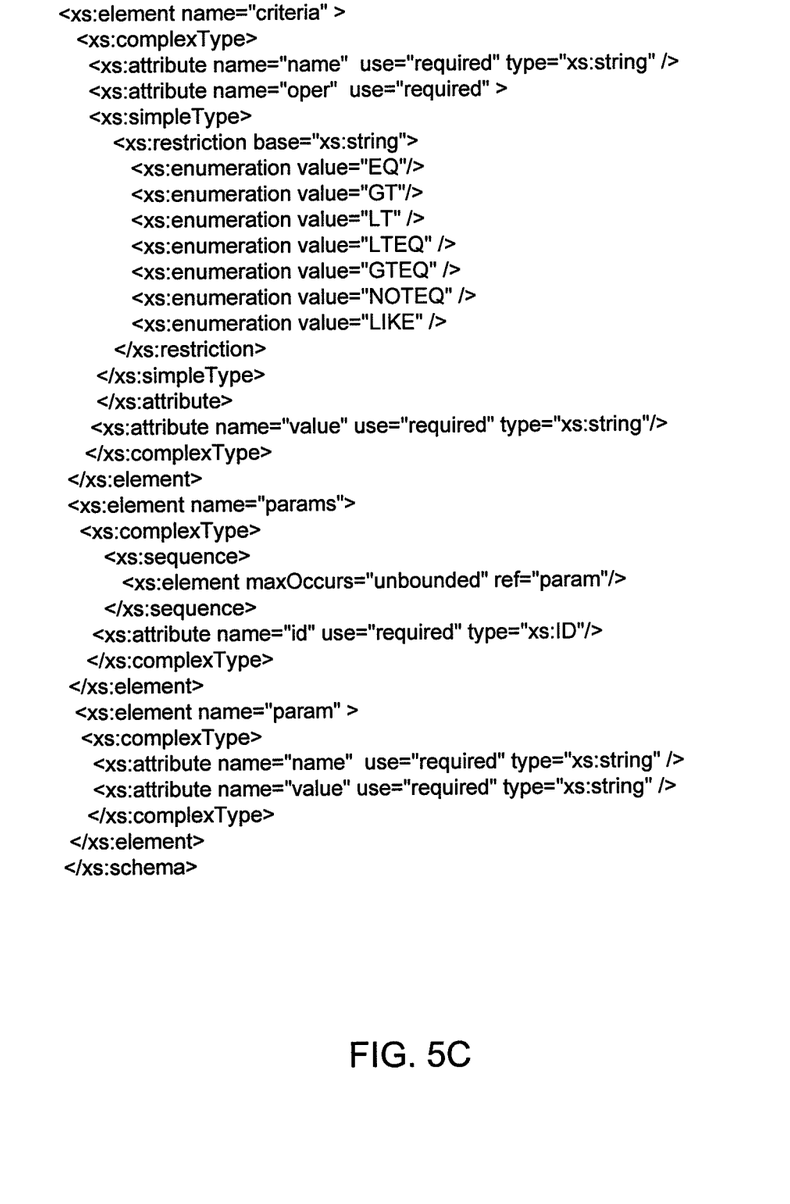
Figure 6:
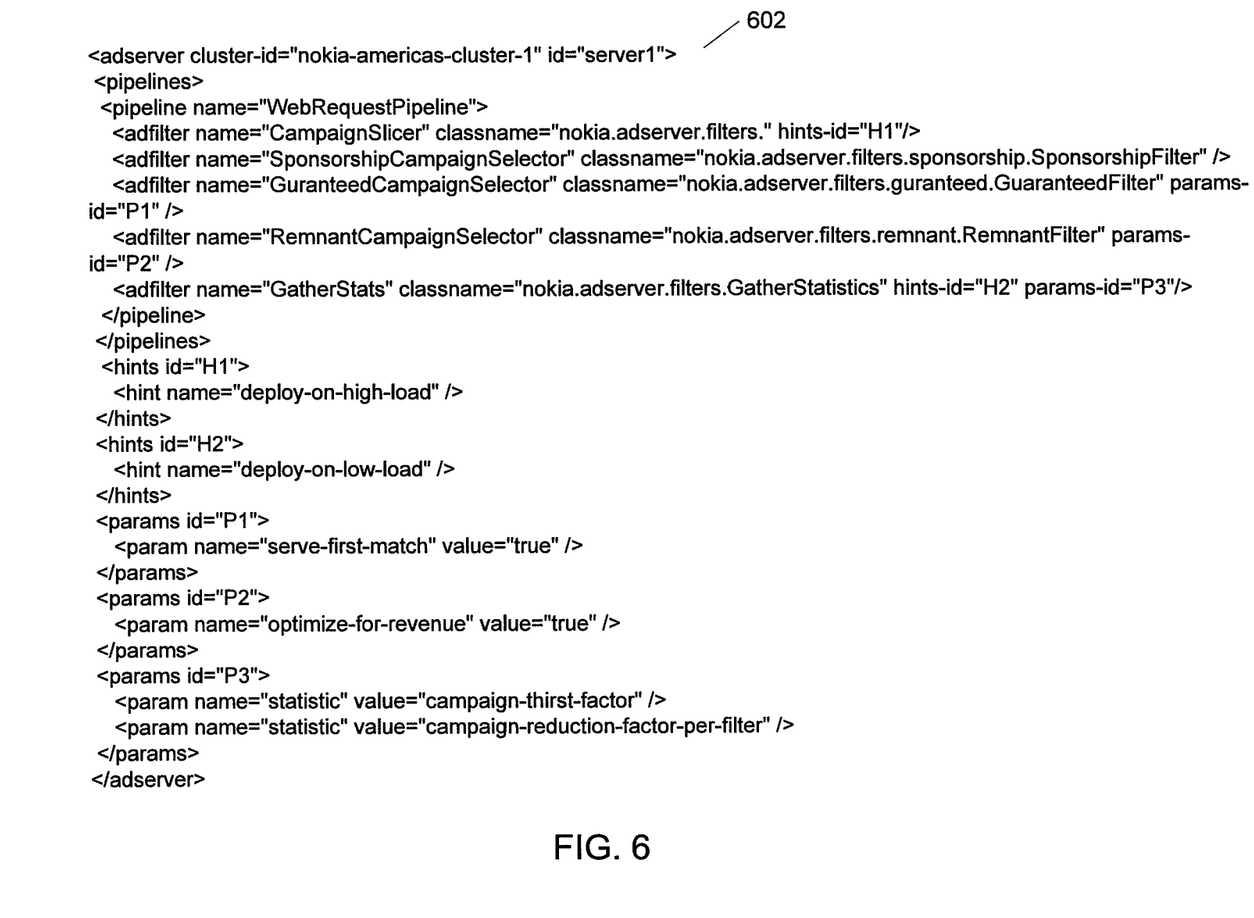
FIG. 6 illustrates an example server deployment file which includes a listing of supported hints according to one or more aspects described herein.

FIGS. 5A-5C illustrate an advertisement server deployment file 502 in accordance with an example aspect of the invention. For example, the deployment file may be an XML schema definition (XSD) file. In FIG. 6, filters may be rearranged so that the filters are deployed in a particular order in the pipeline. In an example embodiment, the order of the filters in the XML sequence may determine its position in the pipeline. For a new filter to be placed at end of a pipeline, the class name may be added to the end of the filter sequence. In another aspect of the invention, if an existing filter is to be deactivated the filter entry may be removed from the XML pipeline element.

As illustrated in FIGS. 5A-5C, the XML pipeline element wraps sequence of advertisement filter elements. In an example embodiment, to add a new hint the deployment file 502 may be edited and new hint added to section 505.

In another example aspect of the invention, an uptake command may be executed to rescan the server deployment file in accordance with an aspect of the invention. In an example embodiment, when the uptake pipeline command is executed, the server may scan the pipeline entries of the XML files, create new pipelines, instantiate specified advertisement filters, and place them into the pipeline in the order they were specified. In an example embodiment, once the pipeline is fully initialized the old pipeline may be removed and the new pipeline put in place. In another example embodiment, needed classes may be packaged into a Java Archive (JAR) file and placed in a known location. Furthermore, in another aspect of the invention, a new class loader may be implemented to load classes from the specified JAR file.

In another example aspect of the invention, in an automatic mode an additional module may be needed to make decisions at runtime. The additional module may also be capable of generating hints. In an example embodiment, all of the supported hints may be specified in a file accessible by the advertisement server. FIG. 5 illustrates a file 502 that may be used to identify hints supported by the advertisement server in accordance with an example aspect of the invention. As illustrated in FIG. 6, a file 602 may include information for example from file 502, regarding e.g. supported hints.

Example hints that may utilize a module to support the hint includes hints such as deploy-on-high-load, deploy-on-low-load, skip-on-high-load —505. In an example embodiment, in order to support this module, a piece of code may have to watch over the system and determine when the system experiences high/low load. In an example embodiment, low load and high load may be defined by an administrator using the number of requests arriving per second. If the number of requests is above or below a specified threshold (e.g. high load may be defined as 50,000 requests per second, low load may be defined as 10,000 requests per second) then the server may take hinted actions. The action may be e.g. to skip a filter or deploy a filter.

Figure 7:
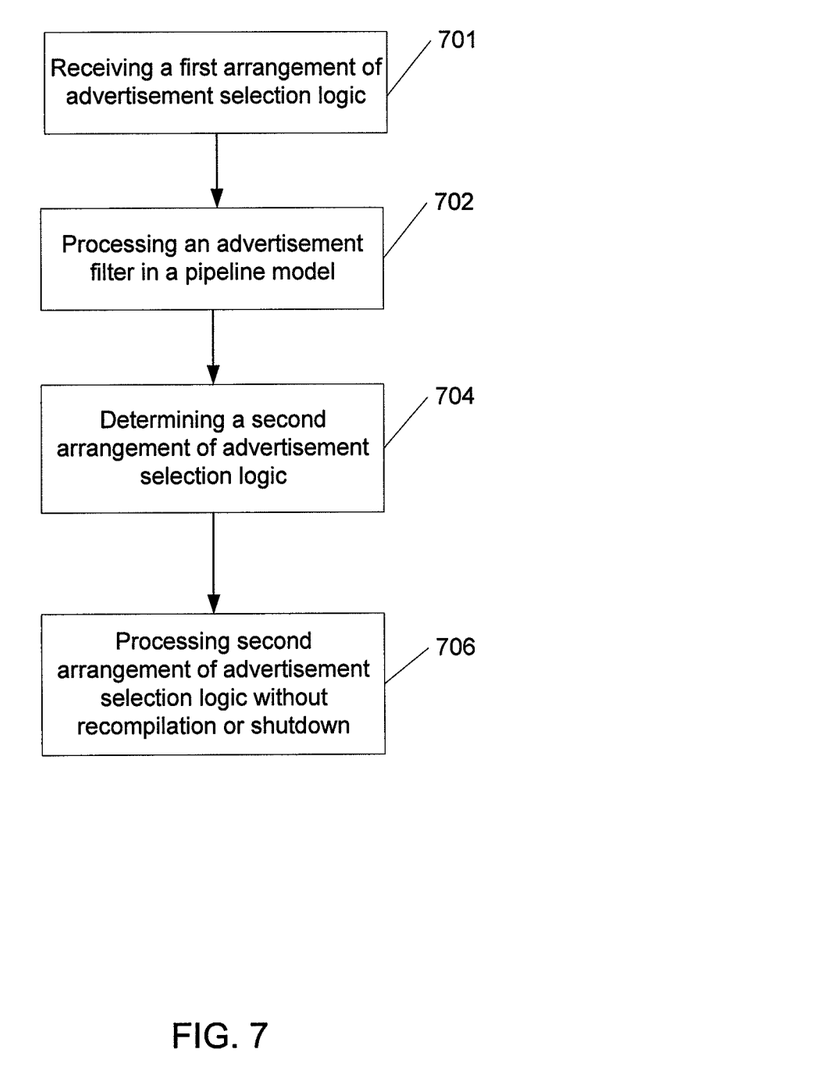
FIG. 7 shows a flowchart illustrating a method of rearranging advertisement selection logic on the fly according to one or more aspects described herein.

FIG. 7 shows a flowchart illustrating a method of rearranging advertisement selection logic on the fly in accordance with an example aspect of the invention. In FIG. 7, at step 701, a first arrangement of advertisement selection logic may be received. The first arrangement of advertisement selection logic may include at least one advertisement filter. Next, at step 702, an advertisement filter may be processed in a pipeline model. Next, at step 704, a second arrangement of advertisement selection logic may be determined. Finally, at step 706, the second arrangement of advertisement selection logic may be processed without recompilation or shutdown of system resources such as a server.

Figure 8:
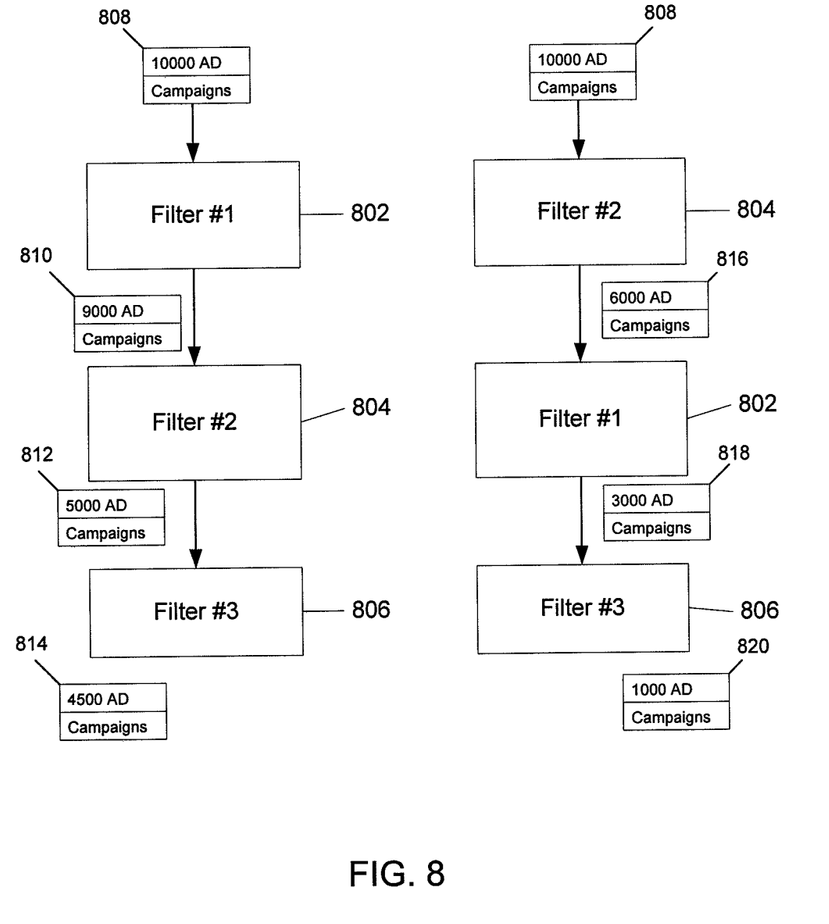
FIG. 8 illustrates a block diagram of a series of filters according to one or more aspects described herein.

FIG. 8 illustrates a block diagram of a series of filters in a pipeline model in accordance with an example aspect of the invention. In FIG. 8, the filters (802, 804, and 806) are arranged in a pipeline architecture. Each filter starts out with a campaign list that was the output of a previous filter. In an example embodiment, the filters are installed sequentially and each advertisement request executes through all filters, beginning to end. For example, filter #1 802 may receive an advertisement selection list 808 including 10,000 advertisement campaigns. After processing the 10,000 advertisement campaigns through filter #1 802, a second advertisement list 810 having 9,000 advertisement campaigns may be outputted. Similarly, filter #2 804 may receive an advertisement selection list 810 including 9,000 advertisement campaigns. After processing the 9,000 advertisement campaigns through filter #2 804, a third advertisement list 812 having 5,000 advertisement campaigns may be outputted. Furthermore, filter #3 806 may receive an advertisement selection list 812 including 5,000 advertisement campaigns. After processing the 5,000 advertisement campaigns through filter #3 806, a fourth advertisement list 814 having 4,500 advertisement campaigns may be outputted. In an example embodiment, advertisement server may pick at least one campaign to be served from the advertisement list 814.

As shown in FIG. 8, the filters 802-806 may be rearranged such that the most efficient filter, filter #2 804, is positioned as the first filter in the pipeline architecture to deploy the most selective filter first. As illustrated in FIG. 8, the deployment of filter #2 804, followed by filter #1 802, followed by filter #3 806 reduces the advertisement campaigns from 10,000 to 1000, as illustrated with advertisement selection lists 808, 816, 818, 820. In an example embodiment, advertisement server may pick at least one campaign to be served from the advertisement list 820.

Figure 9:
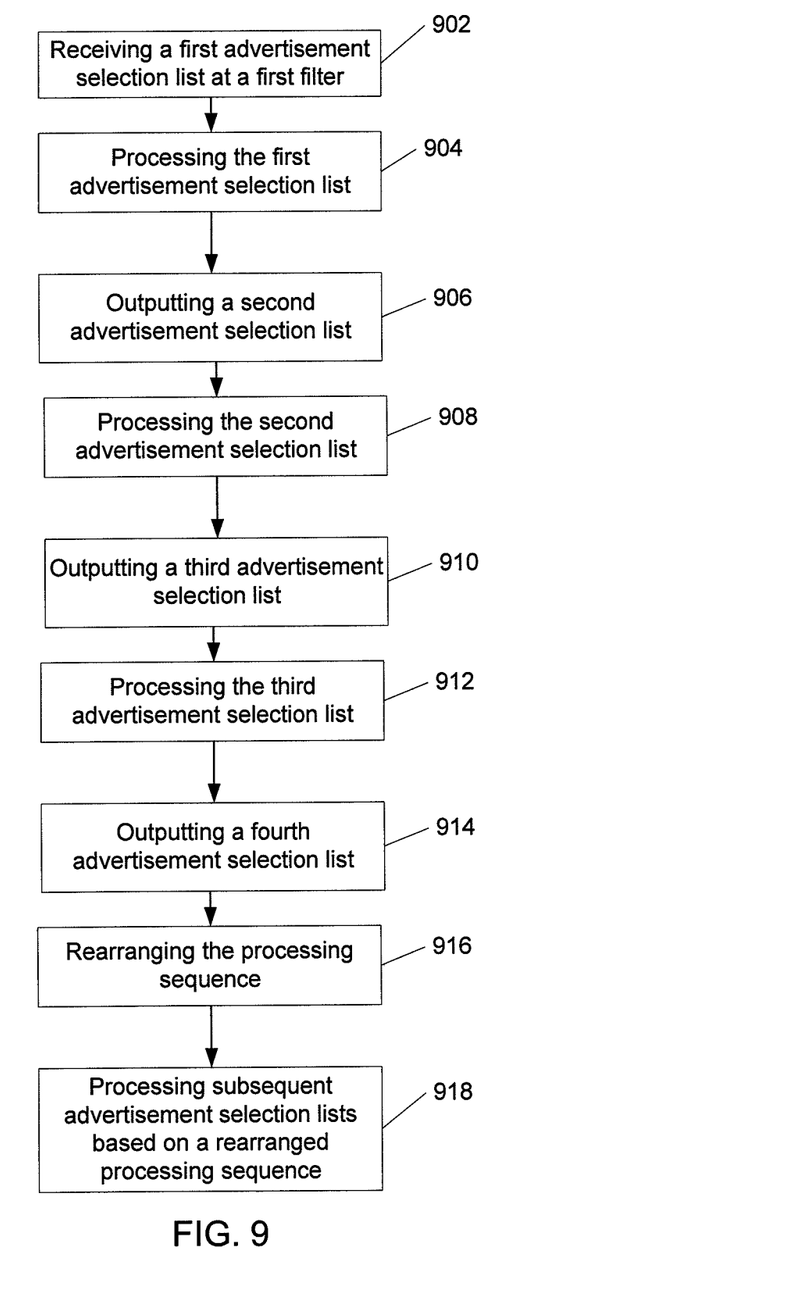
FIG. 9 shows a flowchart illustrating a method of rearranging filters during runtime according to one or more aspects described herein.

FIG. 9 shows a flowchart illustrating a method of rearranging filters during runtime in accordance with an example aspect of the invention. After processing an advertisement selection list through three filters (steps 904, 908, and 912) the filters may be rearranged during runtime for subsequent processing of advertisement selection lists.

In yet another example aspect of the invention, a mobile terminal may be used as a control station to change and/or implement advertisement selection logic. In an example embodiment, the mobile terminal may update the advertisement selection logic and forward changes to an advertisement server for execution. In another example aspect of the invention, a mobile device may be configured to perform and/or provide some or all of the advertisement selection logic related tasks, functions and controlling, according to one or more embodiments described herein The present invention has been described in terms of example embodiments. Numerous other embodiments, modifications and variations within the scope and spirit of the appended claims will occur to persons of ordinary skill in the art from a review of this disclosure.

I claim:

1. A method of rearranging a sequence of advertisement selection filters comprising:
   receiving at a mobile user communication device an advertisement selection logic sent over a communication network from an advertisement server, the advertisement selection logic including a first arrangement of a plurality of advertisement selection filters, and the mobile user communication device comprising a processor and a memory that stores computer executable instructions and data used by the processor, wherein the processor:
   processes the advertisement selection logic in a pipeline model according to the first arrangement of the plurality of advertisement selection filters;
   determines an advertisement click history at the mobile user communication device;
   determines a second arrangement of the plurality of advertisement selection filters of the advertisement selection logic based on the click history and based on load statistics when a high load or a low load is detected to implement a respective hint command associated with at least one filter to skip or deploy the at least one filter based on the detected high load or the detected low load;
   processes the advertisement selection logic in the pipeline model according to the second arrangement of the plurality of advertisement selection filters; and
   causes a presentation of one or more advertisements at the mobile user communication device, wherein the one or more advertisements are filtered via the second arrangement of the plurality of advertisement selection filters.

2. The method of claim 1, wherein the second arrangement of the plurality of advertisement selection filters is different from the first arrangement of the plurality of advertisement selection filters, and wherein the mobile user communication device is a personal digital assistant or a cellular telephone.

3. The method of claim 1, wherein at least one advertisement selection filter of the second arrangement of the plurality of advertisement selection filters is different from at least one advertisement selection filter of the first arrangement of the plurality of advertisement selection filters.

4. The method of claim 1, wherein the processor further:
   receives a request to modify the first arrangement of the plurality of advertisement selection filters; and
   generates a hint using at least one self-learning module to process at least the advertisement click history.

5. The method of claim 4, wherein the request to modify is received from a user of the mobile user device.

6. The method of claim 5, wherein determining the second arrangement of the plurality of advertisement selection filters further comprises:
   processing an uptake pipeline command.

7. The method of claim 1, wherein in determining the second arrangement of the plurality of advertisement selection filters in the deployment file, the processor:
   adds at least one filter in the first arrangement of the plurality of advertisement selection filters.

8. The method of claim 1, wherein in determining the second arrangement of the plurality of advertisement selection filters, the processor:
   deletes at least one advertisement selection filter in the first arrangement of the plurality of advertisement selection filters.

9. The method of claim 6, wherein in the processing of the uptake pipeline command the processor:
   causes scanning pipeline entries in the deployment file;
   causes instantiating advertisement selection filters; and
   causes placing the advertisement selection filters in an updated pipeline in a specified order.

10. The method of claim 4, wherein the request to modify is processed based on the hint and is automatically executed.

11. The method of claim 10, wherein the hint is described and stored in a system file.

12. The method of claim 1, wherein determining of the second arrangement of the plurality of advertisement selection filters is further based on hints.

13. The method of claim 1, wherein determining of the second arrangement of the plurality of advertisement selection filters is d further based on hints and additional criterion.

14. The method of claim 4, wherein the request to modify the first arrangement of the plurality of advertisement selection filters is based on statistics.

15. The method of claim 14, wherein the statistics include server load statistics.

16. A non-transitory computer-readable storage medium carrying one or more sequences of one or more instructions stored thereon executed by a processor to perform a method of rearranging a sequence of advertisement selection filters, the method comprising:
   receiving at a mobile user communication device an advertisement selection logic sent over a communication network from a advertisement server, the advertisement selection logic including a first arrangement of a plurality of advertisement selection filters;

processing the advertisement selection logic in a pipeline model according to the first arrangement of a plurality of advertisement selection filters;

determining an advertisement click history at the mobile user communication device;

determining a second arrangement of the plurality of advertisement selection filters of the advertisement selection logic based on the click history and based on load statistics when a high load or a low load is detected to implement a respective hint command associated with at least one filter to skip or deploy the at least one filter based on the detected high load or the detected low load;

processing the advertisement selection logic in the pipeline model according to the second arrangement of the plurality of advertisement selection filters; and causing a presentation of one or more advertisements at the mobile user communication device, wherein the one or more advertisements are filtered via the second arrangement of the plurality of advertisement selection filters.

17. The non-transitory computer-readable storage medium of claim 16, wherein the second arrangement of the plurality of advertisement selection filters is different from the first arrangement of the plurality of advertisement selection filters.

18. The non-transitory computer-readable storage medium of claim 16, wherein at least one advertisement selection filter of the second arrangement of the plurality of advertisement selection filters is different from at least one advertisement selection filter of the first arrangement of the plurality of advertisement selection filters.

19. A non-transitory computer-readable storage medium carrying one or more sequences of one or more instructions stored thereon executed by a processor to perform a method of rearranging a sequence of advertisement selection filters, the method comprising:

receiving at a mobile user communication device an advertisement selection logic sent over a communication network from a advertisement server, the advertisement selection logic including a first arrangement of a plurality of advertisement selection filters;

processing the advertisement selection logic in a pipeline model according to the first arrangement of a plurality of advertisement selection filters;

determining an advertisement click history at the mobile user communication device;

determining a second arrangement of the plurality of advertisement selection filters of the advertisement selection logic based on the click history and based on load statistics when a high load or a low load is detected to implement a respective hint command associated with at least one filter to skip or deploy the at least one filter based on the detected high load or the detected low load, wherein the determining the second arrangement of the plurality of advertisement selection filters is further based on hints, and wherein the hints comprise one of (i) deploy-on-high-load, (ii) deploy-on-low-load, and (iii) skip-on-high-load;

processing the advertisement selection logic in the pipeline model according to the second arrangement of the plurality of advertisement selection filters; and causing a presentation of one or more advertisements at the mobile user communication device, wherein the one or more advertisements are filtered via the second arrangement of the plurality of advertisement selection filters.

20. The non-transitory computer-readable storage medium of claim 19, wherein at least one advertisement filter of the second arrangement of the plurality of advertisement selection filters is different from at least one advertisement filter of the first arrangement of the plurality of advertisement selection filters.

21. The non-transitory computer-readable storage medium of claim 19, wherein the first arrangement of the plurality of advertisement selection filters includes at least two advertisement selection filters and the second arrangement of advertisement selection logic includes at least two advertisement selection filters, the at least two advertisement selection filters of the first arrangement of the plurality of advertisement selection filters are in a different sequential order than the at least two advertisement selection filters of the second arrangement of the plurality advertisement selection filters.

22. The non-transitory computer-readable storage medium of claim 19, wherein the method further comprises:

receiving a request to modify the first arrangement of the plurality of advertisement selection filters.

23. The non-transitory computer-readable storage medium of claim 19, wherein determining the second arrangement of the plurality of advertisement selection filters further comprises:

processing an uptake pipeline command.

24. The non-transitory computer-readable storage medium of claim 19, wherein in determining the second arrangement of the plurality of advertisement selection filters in the deployment file, the method comprises:

deleting at least one advertisement selection filter in the first arrangement of the plurality of advertisement selection filters.

25. The non-transitory computer-readable storage medium of claim 19, wherein in determining the second arrangement of the plurality of advertisement selection filters in the deployment file, the method comprises:

adding at least one advertisement selection filter in the first arrangement of the plurality of advertisement selection filters.

26. The non-transitory computer-readable storage medium of claim 23, wherein in the processing of the uptake pipeline command the method comprises:

scanning pipeline entries in the deployment file;
instantiating advertisement selection filters; and
placing the advertisement selection filters in an updated specified order.

27. The non-transitory computer-readable storage medium of claim 22, wherein the request to modify the first arrangement of the plurality of advertisement selection filters is received from a hint.

28. The non-transitory computer-readable storage medium of claim 22, wherein the request to modify the first arrangement of the plurality of advertisement selection filters is based on statistics.

29. A non-transitory computer-readable storage medium carrying one or more sequences of one or more instructions stored thereon executed by a processor to perform a method of rearranging a sequence of advertisement selection filters, the method comprising:

receiving at a mobile user communication device a request to process a first advertisement selection list sent over a communication network from a advertisement server;

determining at least one parameter from the advertisement request, the at least one parameter includes a first order of a plurality of advertisement selection filters;

determining an arrangement of advertisement selection logic based on processing of the at least one parameter, the arrangement of advertisement selection logic includes a second order of the plurality of advertisement selection filters;

determining an advertisement click history at the mobile user communication device;

causing transmission of the arrangement of advertisement selection logic for processing of a future advertisement request;

causing a rearrangement of a sequence of filters in a deployment file based on the advertisement click history and based on load statistics and the processing of the at least one parameter, processing of the arrangement of advertisement selection logic, or a combination thereof when a high load or a low load is detected to implement a respective hint command associated with at least one filter to skip or deploy the at least one filter based on the detected high load or the detected low load; and causing a presentation of one or more advertisements at the mobile user communication device, wherein the one or more advertisements are filtered via the sequence of rearranged filters.

30. A method of processing advertisement selection lists comprising:

receiving at a mobile user communication device a request, sent over a communication network from a advertisement server, to process a first advertisement selection list, the mobile user communication device comprising a processor and a memory that stores computer executable instructions and data used by the processor, wherein the processor:

processes the first advertisement selection list through a first filter, the first advertisement selection list having a first amount of advertisement campaigns;

causes outputting from the first filter a second advertisement selection list having a second amount of advertisement campaigns;

processes the second advertisement selection list through a second filter;

causes outputting from the second filter a third advertisement selection list having a third amount of advertisement campaigns;

processes the third advertisement selection list through a third filter;

causes outputting from the third filter a fourth advertisement selection list having a fourth amount of advertisement campaigns;

determines an advertisement click history at the mobile user communication device;

causes rearranging the processing sequence of the first filter, the second filter, and the third filter in a deployment file during runtime without recompilation and shutdown of the computing device based on load statistics when a high load or a low load is detected to implement a respective hint command associated with at least one filter to skip or deploy the at least one filter based on the detected high load or the detected low load; and causes a presentation of one or more advertisements at the mobile user communication device, wherein the one or more advertisements are filtered via the sequence of rearranged filters, wherein the rearranged processing sequence of the first filter, the second filter, and the third filter are placed in a pipeline for processing subsequent advertisement selection lists using the rearranged processing sequence, and the rearranging of the processing sequence is based on the advertisement click history and on the processing of the first advertisement selection list, the processing of the second advertisement selection list, the processing of the third advertisement selection, or a combination thereof.

31. A non-transitory computer-readable storage medium carrying one or more sequences of one or more instructions stored thereon executed by a processor to perform a method of processing advertisement selection lists, the method comprising:

receiving at a mobile user communication device a request, sent over a communication network from a advertisement server, to process a first advertisement selection list;

processing the first advertisement selection list through a first filter, the first advertisement selection list having a first amount of advertisement campaigns;

outputting from the first filter a second advertisement selection list having a second amount of advertisement campaigns;

processing the second advertisement selection list through a second filter;

outputting from the second filter a third advertisement selection list having a third amount of advertisement campaigns;

processing the third advertisement selection list through a third filters outputting from the third filter a fourth advertisement selection list having a fourth amount of advertisement campaigns;

determining an advertisement click history at the mobile user communication device;

rearranging the processing sequence of the first filter, the second filter, and the third filter in a deployment file during runtime without recompilation and shutdown of the computing device based on load statistics when a high load or a low load is detected to implement a respective hint command associated with at least one filter to skip or deploy the at least one filter based on the detected high load or the detected low load; and presenting one or more advertisements at the mobile user communication device, wherein the one or more advertisements are filtered via the sequence of rearranged filters, wherein the rearranged processing sequence of the first filter and the second filter are placed in a pipeline for processing subsequent advertisement selection lists using the rearranged processing sequence, and the rearranging of the processing sequence is based on the advertisement click history and on the processing of the first advertisement selection list, the processing of the second advertisement selection list, or a combination thereof.

* * * * *